US005505400A

United States Patent [19]
Boelstler et al.

[11] Patent Number: 5,505,400
[45] Date of Patent: Apr. 9, 1996

[54] SEAT BELT RETRACTOR WITH CINCH MECHANISM

[75] Inventors: Richard A. Boelstler, Warren; Chhay Siev, Shelby Township, both of Mich.

[73] Assignee: TRW Vehicle Safety Systems Inc., Lyndhurst, Ohio

[21] Appl. No.: 389,754

[22] Filed: Feb. 15, 1995

[51] Int. Cl.⁶ .......................... B60R 22/41; B60R 22/415
[52] U.S. Cl. ........................ 242/382.2; 242/384.1; 242/384.2
[58] Field of Search .................. 242/382.2, 382.1, 242/382.4, 384.1, 384.2; 280/806; 297/475, 476, 477, 478

[56] References Cited

U.S. PATENT DOCUMENTS

| | | |
|---|---|---|
| 3,862,727 | 1/1975 | Fisher . |
| 3,944,163 | 3/1976 | Hayashi et al. . |
| 5,232,177 | 8/1993 | Hibata ................................. 242/382.2 |
| 5,257,754 | 11/1993 | Hishon . |

*Primary Examiner*—John M. Jillions
*Attorney, Agent, or Firm*—Tarolli, Sundheim, Covell, Tummino & Szabo

[57] ABSTRACT

A seat belt retractor (10) has a rotatable spool (50) on which seat belt webbing (16) is wound. Rotation of the spool (50) results in rotation of an actuator gear (170) which drives an actuator ring (200). The actuator gear (170) and actuator ring (200) control movement of a cinch lever (130) to an actuated position to move a lock pawl (100) into engagement with a ratchet wheel (90) to block rotation of the spool (50) in a belt withdrawal direction (58). When all the belt webbing (16) is wound on the spool (50), a blocking member (230) on the actuator ring (200) moves the cinch lever (130) against a vehicle deceleration sensor lever (118) to minimize rattling of the sensor lever and of an inertia mass (112). A projection (216) on the actuator ring (200) ensures proper movement of the cinch lever (130) from the actuator ring (200) onto a cam surface (194) of the actuator gear (170). A spring (182) on the actuator gear (170) allows the actuator gear to assume a correctly timed rotational position when the belt webbing (16) is fully withdrawn from the spool (50).

27 Claims, 6 Drawing Sheets

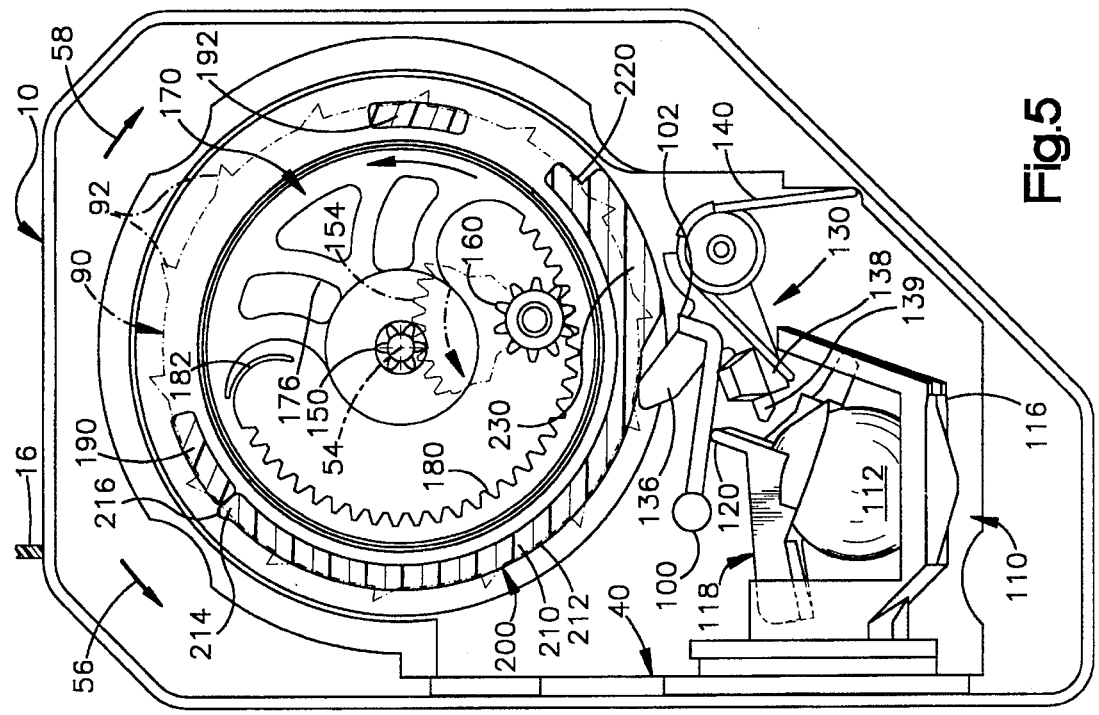
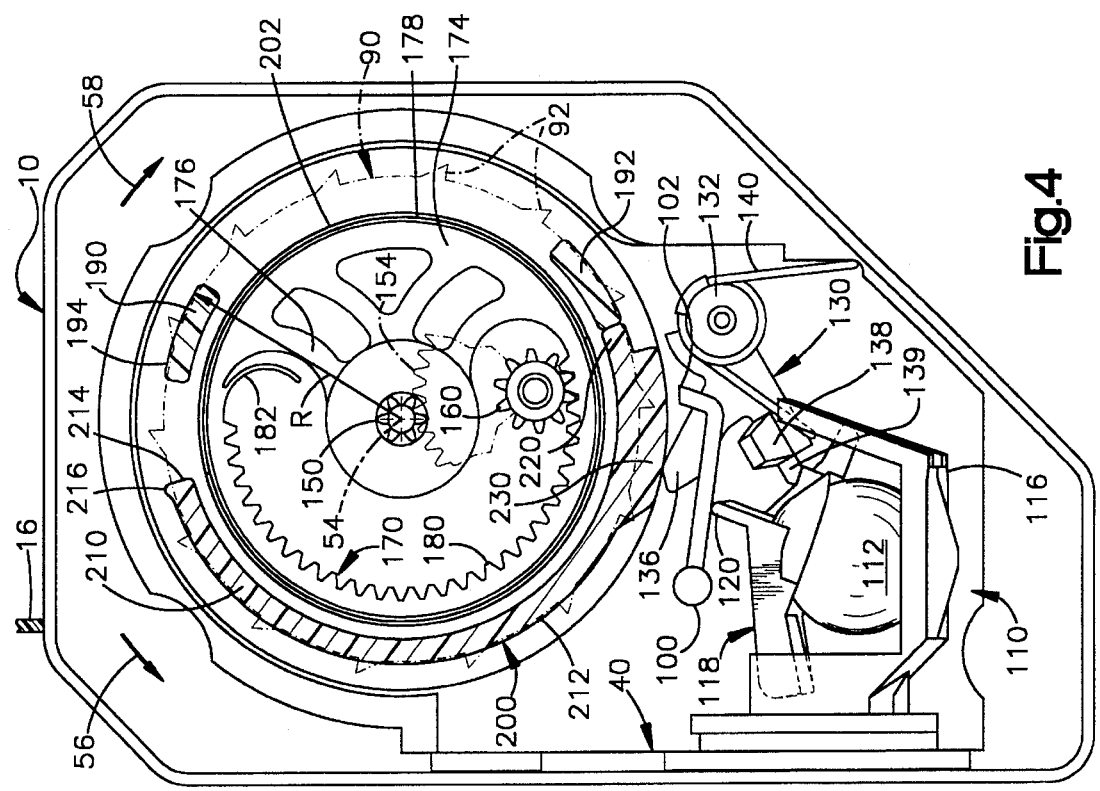
Fig.5
Fig.4

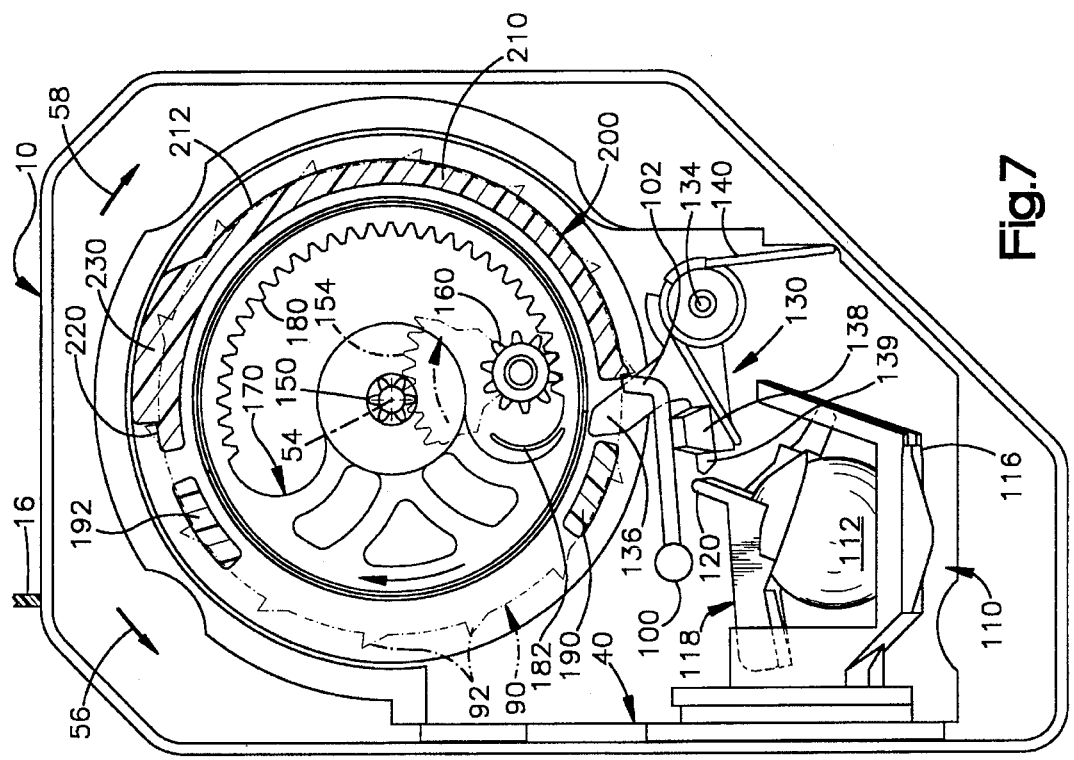
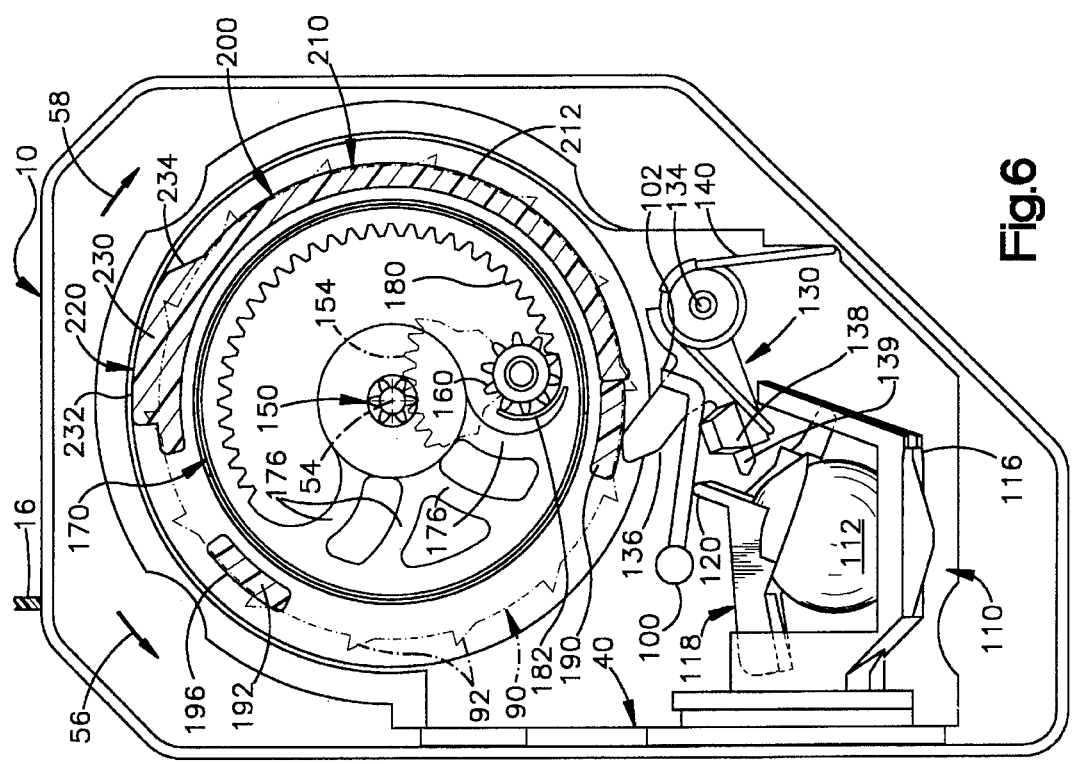

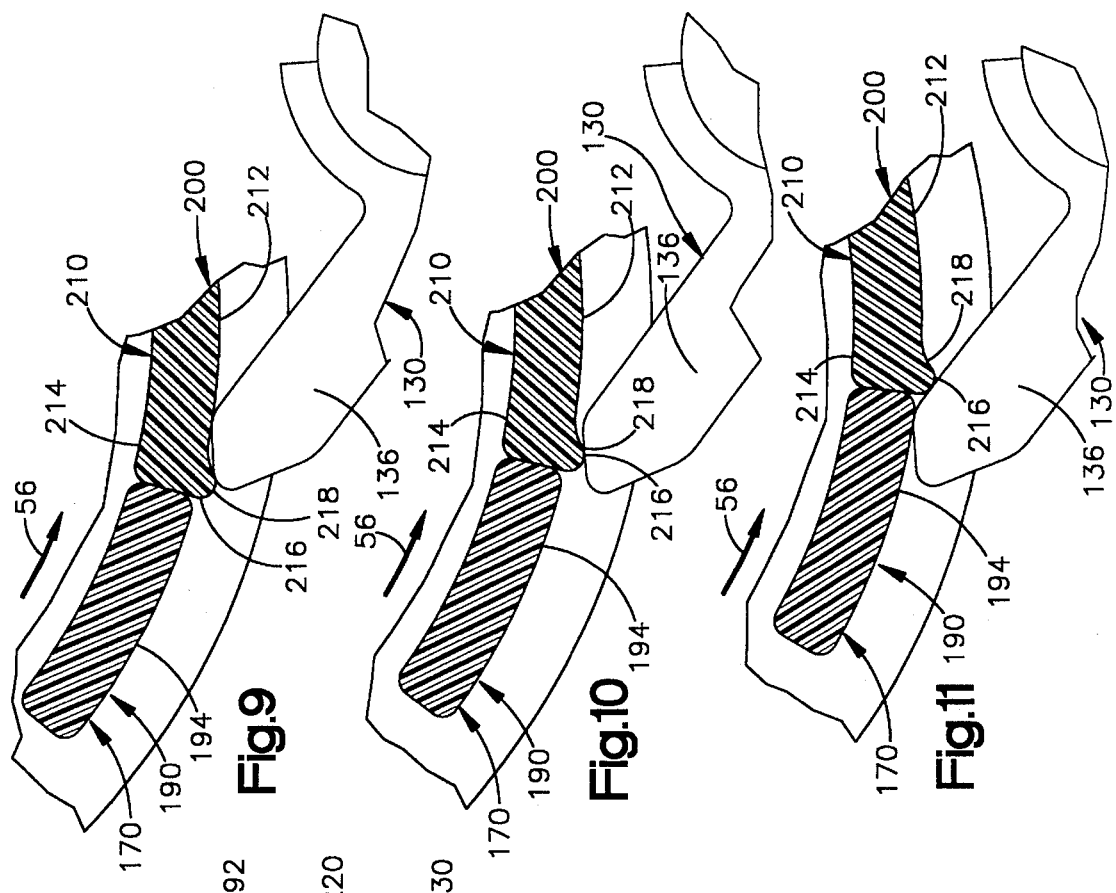
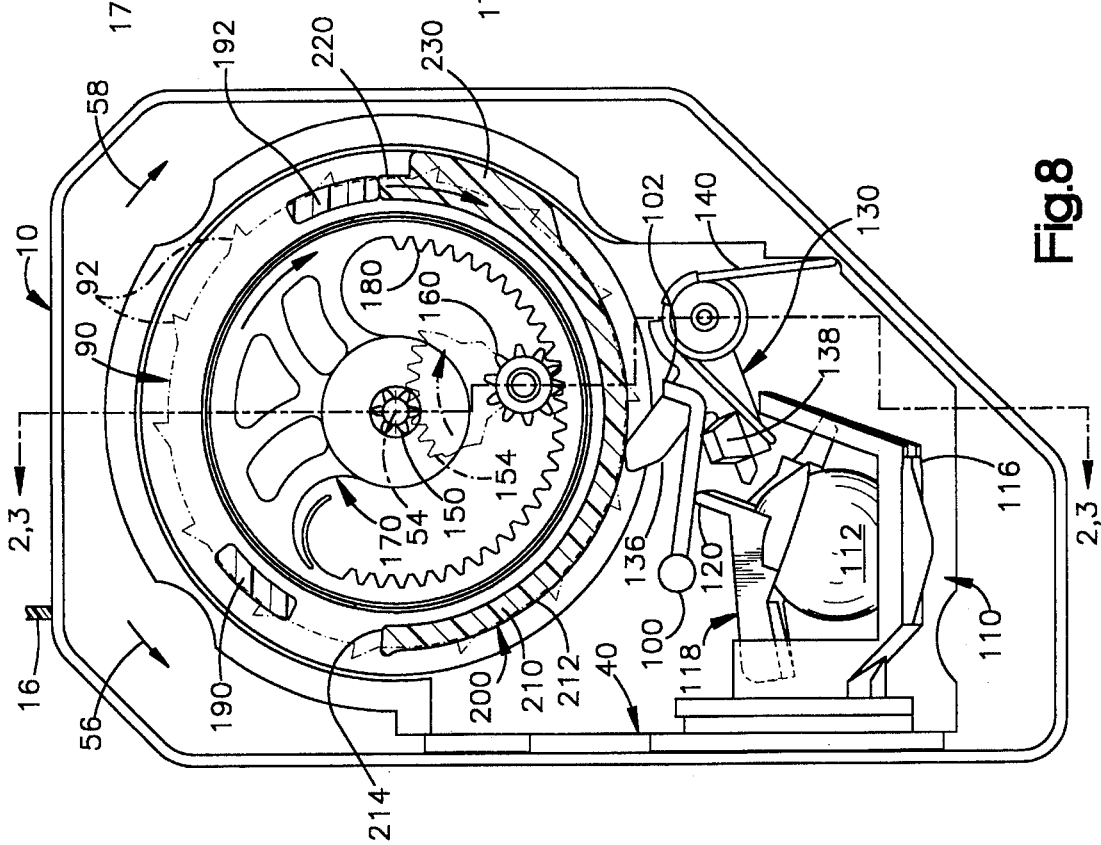

5,505,400

SEAT BELT RETRACTOR WITH CINCH MECHANISM

BACKGROUND OF THE INVENTION

1. Technical Field

The present invention relates to a vehicle seat belt webbing retractor, and particularly to a retractor including a cinch mechanism for blocking withdrawal of belt webbing in response to rotation of a spool of the retractor in a predetermined manner.

2. Description of the Prior Art

A typical seat belt system used to restrain a vehicle occupant includes a length of belt webbing wound on a spool of a seat belt webbing retractor. The belt webbing is extensible about a vehicle occupant to restrain the occupant.

In some seat belt systems, the webbing is prevented from being further withdrawn from the retractor throughout the time that the webbing is secured around the vehicle occupant or about a child seat, i.e., the webbing is maintained in a cinched condition. It is known to set a seat belt webbing retractor in a cinched condition by withdrawing the seat belt webbing completely from the spool then allowing some webbing to retract onto the spool.

SUMMARY OF THE INVENTION

The present invention is a vehicle seat belt webbing retractor comprising a spool supported for rotation about a spool axis in a belt withdrawal direction and in an opposite belt retraction direction. A length of seat belt webbing is wound on the spool and is extensible about a vehicle occupant to restrain the vehicle occupant. A ratchet is connected for rotation with the spool in the belt withdrawal direction and in the belt retraction direction. A lock pawl is supported for movement relative to the ratchet from a disengaged position to an engaged position in engagement with the ratchet to block rotation of the spool in the belt withdrawal direction. An actuator lever is engageable with the lock pawl and is movable from an unactuated position to an actuated position to effect movement of the lock pawl into engagement with the ratchet.

In one embodiment of the invention, the retractor includes vehicle deceleration sensing means comprising an inertia member supported for movement in response to vehicle deceleration above a predetermined deceleration and a sensor lever movable in response to the movement of the inertia member to move the lock pawl into engagement with the ratchet. The retractor also includes means responsive to a predetermined amount of rotation of the spool in the belt retraction direction for moving the actuator lever from the unactuated position to a blocking position blocking the movement of the sensor lever and the movement of the inertia member.

In another embodiment of the invention, the actuator lever includes a cam follower portion, and the retractor includes cam means for controlling movement of the actuator lever between the unactuated position and the actuated position. The cam means includes first and second relatively movable cam surfaces which are sequentially engageable by the cam follower portion of the actuator lever to hold the actuator lever in the unactuated position. The first cam surface has a projecting portion for moving the cam follower portion of the actuator lever out of the unactuated position in a first direction away from the actuated position.

In yet another embodiment of the invention, the retractor includes a rotatable member which is rotatable in response to rotation of the spool and which includes an arcuate gear segment. The actuator lever is movable into the actuated position in response to rotation of the rotatable member upon a predetermined amount of rotation of the spool. A drive gear is rotatable about a fixed axis in response to rotation of the spool about the spool axis. The drive gear is in meshing engagement with the arcuate gear segment on the rotatable member to rotate the rotatable member in response to rotation of the spool. The retractor includes means for enabling rotation of the drive gear while preventing rotation of the rotatable member beyond a predetermined rotational position during rotation of the spool in the belt withdrawal direction.

BRIEF DESCRIPTION OF THE DRAWINGS

Further features of the present invention will become apparent to those skilled in the art to which the present invention relates from reading the following specification with reference to the accompanying drawings, in which:

FIG. 4 is a schematic illustration showing parts of the retractor of FIG. 1 in a position of complete belt retraction;

FIG. 5 is a view similar to FIG. 4 showing the parts of the retractor in a position of partial belt withdrawal;

FIG. 6 is a view similar to FIG. 4 showing the parts of the retractor in a position of complete belt withdrawal;

FIG. 7 is a view similar to FIG. 4 showing the parts of the retractor in a cinching position upon partial belt retraction;

FIG. 8 is a view similar to FIG. 4 showing the parts of the retractor in a non-cinching position upon further belt retraction;

FIG. 9 is an enlarged view showing a cam portion of the retractor of FIG. 1 in a first position;

FIG. 10 is a view similar to FIG. 9 showing the cam portion of the retractor in a second position;

FIG. 11 is a view similar to FIG. 9 showing the cam portion of the retractor in a third position;

DESCRIPTION OF PREFERRED EMBODIMENT

Figure 1:
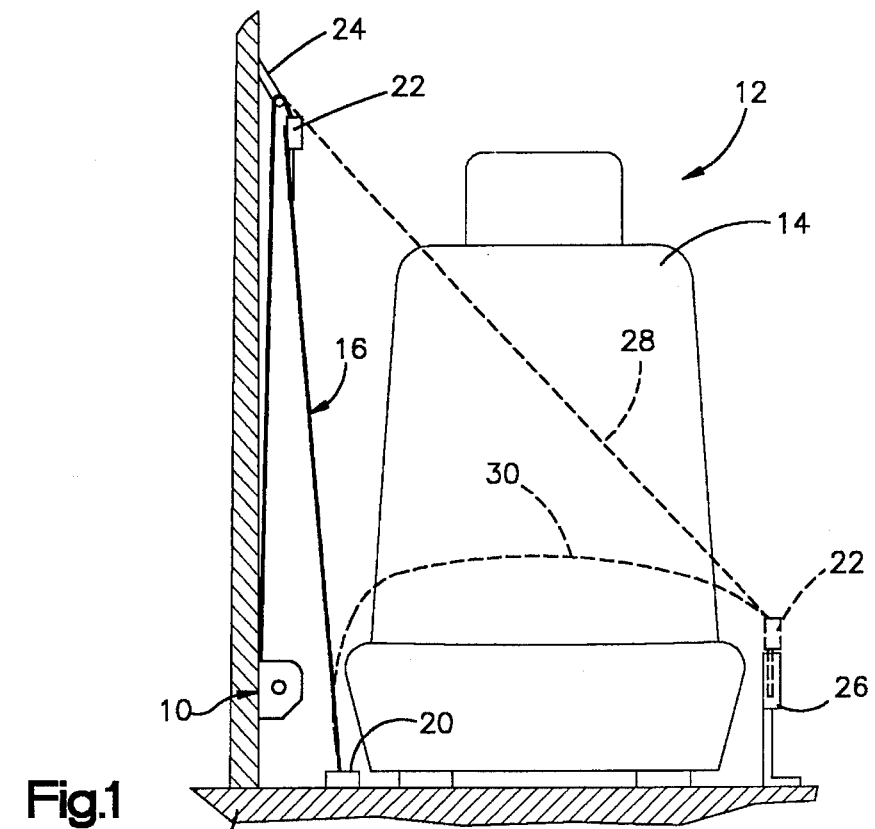
FIG. 1 is a schematic illustration of a vehicle seat belt system including a seat belt retractor constructed in accordance with the present invention.

The present invention relates to a vehicle seat belt webbing retractor and particularly to a retractor including a cinch mechanism for blocking withdrawal of belt webbing in response to rotation of a spool of the retractor in a predetermined manner. The present invention is applicable to various retractor constructions. As representative of the present invention, FIG. 1 illustrates a seat belt webbing retractor 10. The retractor 10 is incorporated in a three-point continuous loop seat belt system 12 for use in restraining an occupant of a vehicle.

During operation of the vehicle, the occupant of the vehicle sits on a seat 14 which is illustrated as a front passenger seat in the vehicle. A length of seat belt webbing 16 is extensible about the vehicle occupant. One end of the length of belt webbing 16 is anchored to the vehicle body 18 at an anchor point 20 located on one side of the seat 14. The opposite end of the belt webbing 16 is attached to the retractor 10 which is secured to the vehicle body on the same side of the seat 14. Intermediate its ends, the belt webbing 16 passes through a tongue assembly 22 and a D-ring 24 that is located above the retractor 10 and the anchor point 20. When the seat belt system 12 is not in use, the belt webbing 16 is wound on the retractor 10 and is oriented generally vertically on the one side of the seat 14, as shown in solid lines in FIG. 1.

To engage the seat belt system 12, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 10. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 12 is thus buckled, the length of belt webbing 16 is divided by the tongue assembly 22 into a torso portion 28 which extends across the torso of the occupant and a lap portion 30 which extends across the lap of the occupant.

Figure 2:
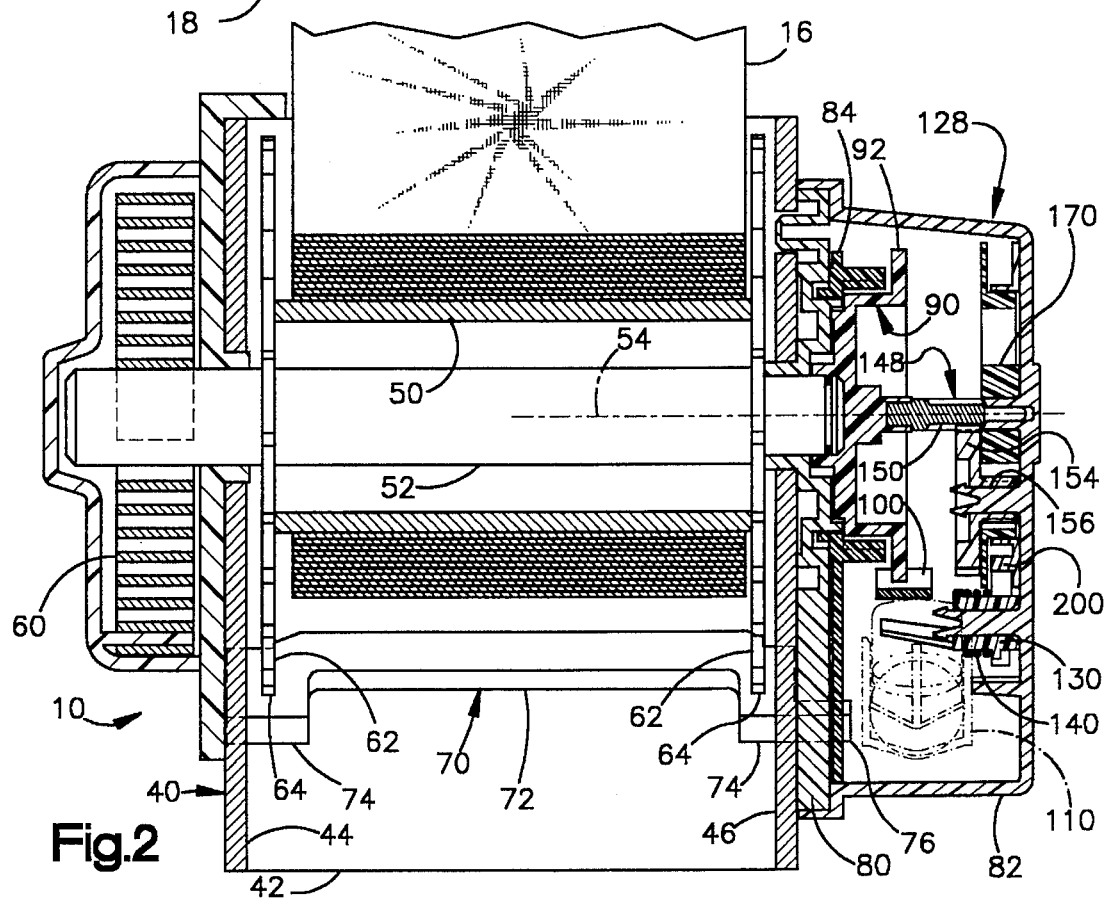
FIG. 2 is a longitudinal sectional view of the retractor of FIG. 1 with parts removed.

The retractor 10 (FIGS. 2–4) includes a frame 40 which is fixed to the vehicle body 18 in a manner not shown. The frame 40 is a single piece of sheet metal stamped and formed to a U-shaped configuration as best seen in FIG. 2. The frame 40 includes a back wall 42 and spaced parallel side walls 44 and 46 which extend generally perpendicular to the back wall.

The retractor 10 includes a spool 50 (FIG. 2). The seat belt webbing 16 is wound on the spool 50. A metal shaft 52 extends through the spool 50 and is fixed for rotation with the spool. The spool 50 and the shaft 52 are supported on the frame 40 for rotation about a spool axis 54 relative to the frame in a belt retraction direction 56 (FIG. 4) and in an opposite belt withdrawal direction 58.

A rewind spring mechanism 60 (FIG. 2) on the side of the frame side wall 44 opposite from the spool 50 is connected with a first end portion of the shaft 52. The rewind spring mechanism 60 biases the spool 50 for rotation in the belt retraction direction 56. A pair of spool locking ratchet wheels 62 are fixed on opposite ends of the shaft 52 for rotation with the shaft and thereby with the spool 50. A plurality of ratchet teeth 64 are disposed in a circular array on the outer periphery of each one of the spool locking ratchet wheels 62.

A lock bar 70 is supported in openings (not shown) in the side walls 44 and 46 of the frame 40 for pivotal movement relative to the frame. The lock bar 70 has a central portion 72 which extends between a pair of locking portions 74. The locking portions 74 of the lock bar 70 are movable into engagement with the spool locking ratchet wheels 62 to block rotation of the spool 50 in the belt withdrawal direction 58. A finger portion 76 of the lock bar 70 extends from one end (the right end as viewed in FIG. 2) of the lock bar 70.

A bearing plate 80 is fixedly connected with the side wall 46 of the frame 40 and is enclosed by a cover 82. A lock bar actuator 84 is supported on the bearing plate 80 for limited rotation about the spool axis 54. The lock bar actuator 84 has a hub portion 85 which is supported for rotation on the bearing plate 80. A generally planar cam portion 87 of the lock bar actuator 84 extends radially outward from the hub portion 85.

The cam portion 87 of the lock bar actuator 84 has a cam slot 86 (FIG. 3) into which the finger portion 76 of the lock bar 70 extends. Rotation of the lock bar actuator 84 relative to the bearing plate 80 and the frame 40 lifts the finger portion 76 of the lock bar 70 to move the locking portions 74 of the lock bar into engagement with the spool locking ratchet wheels 62. A return spring (not shown) acting between the lock bar actuator 84 and the bearing plate 80 biases the lock bar actuator 84 to a position in which the lock bar 70 is disengaged from the spool locking ratchet wheels 62.

A pilot ratchet 90 is fixed for rotation on a portion of the shaft 52 which projects beyond the lock bar actuator 84. A plurality of ratchet teeth 92 are disposed in a circular array on the outer periphery of the pilot ratchet 90.

A cylindrical pilot pawl support post (not shown) projects axially from the lock bar actuator 84 in a direction away from the frame 84. A pilot pawl 100 is supported on the pilot pawl support post for pivotal movement relative to the lock bar actuator. The pilot pawl 100 has a tooth 102 which projects upward and radially in a direction toward the ratchet teeth 92 on the pilot ratchet 90. The tooth 102 on the pilot pawl 100 is disposed axially coincident with (i.e., lies in the same plane as) the ratchet teeth 92 on the pilot ratchet 90. The pilot pawl 100 normally is disposed, under the influence of gravity, in a position in which the tooth 102 is spaced downward from and radially outward from the ratchet teeth 92 on the pilot ratchet 90.

The retractor 10 includes a vehicle deceleration sensing assembly 110 for moving the pilot pawl 100 into engagement with the pilot ratchet 90 in the event of sudden vehicle deceleration such as occurs in a vehicle collision. The vehicle deceleration sensing assembly 110 includes an inertia mass 112, which is preferably a steel ball. The inertia mass 112 rests in a cavity in a sensor housing 116 supported on the frame 40. A sensor lever 118 is mounted on the sensor housing 116 for pivotal movement relative to the sensor housing. The sensor lever 118 rests upon the inertia mass 112 and has a portion 120 which extends upwardly into engagement with the pilot pawl 100.

Figure 3:
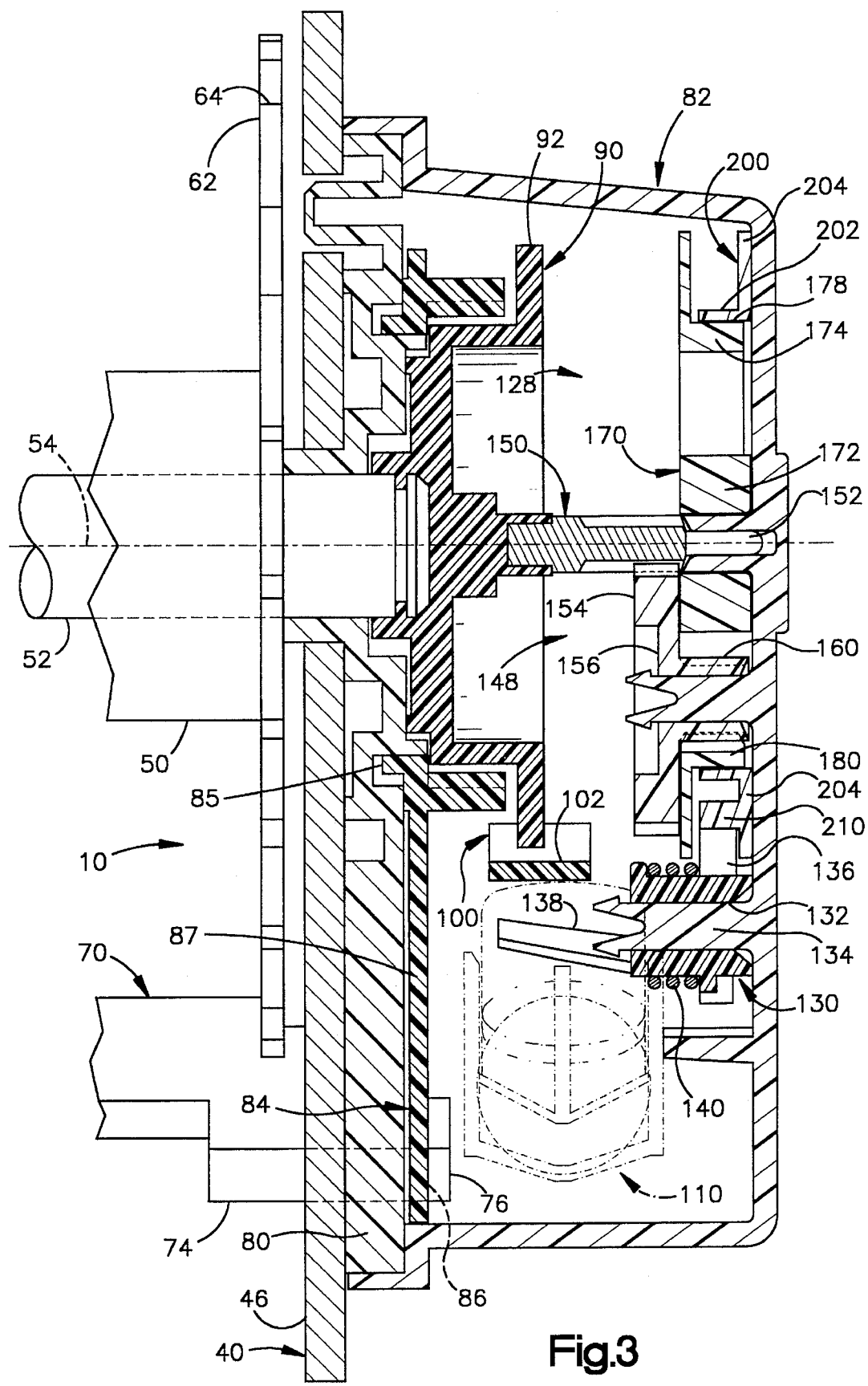
FIG. 3 is an enlarged view of a portion of the retractor of FIG. 1.

When the vehicle in which the retractor 10 is mounted is not experiencing deceleration above a predetermined deceleration, the inertia mass 112 rests at the bottom of the cavity in the sensor housing 116. When the inertia mass 112 is in this position, the pilot pawl 100 is spaced from the ratchet teeth 92 on the pilot ratchet 90. Upon the vehicle experiencing deceleration above the predetermined deceleration, the inertia mass 112 moves relative to the sensor housing 116. The sensor lever 118 pivots upward from the position shown in FIG. 4 and presses the pilot pawl 100 upward into engagement with the pilot ratchet 90. Rotation of the spool 50 and the pilot ratchet 90 in the belt withdrawal direction 58 causes the next available ratchet tooth 92 on the pilot ratchet to engage the pilot pawl 100. Thereafter, the pilot pawl 100 transmits rotational force from the pilot ratchet 90 through the pilot pawl support post to the lock bar actuator 84 (FIG. 3). This rotational force causes the lock bar actuator 84 to pivot about the spool axis 54. The surfaces defining the cam slot 86 in the lock bar actuator 84 move relative to the finger portion 76 of the lock bar 70 into engagement with the spool locking ratchet wheels 62. The engagement of the lock bar 70 with the spool locking ratchet wheels 62 blocks rotation of the spool 50 in the belt withdrawal direction 58, to restrain the vehicle occupant.

The retractor 10 includes a cinch mechanism designated generally 128 (FIG. 2) for selectively moving the pilot pawl 100 into engagement with the pilot ratchet 90 to block rotation of the spool 50 in the belt withdrawal direction 58. The cinch mechanism 128 includes a cinch lever 130 (FIGS. 2–4). The cinch lever 130 has a hub portion 132 (FIG. 3) which is supported for pivotal movement on a cinch lever support post 134 on the cover 82. The cinch lever 130 has a cam follower portion 136 which extends upward in a direction generally toward the spool axis 54. A lifting portion 138 of the cinch lever 130 projects axially under the pilot pawl 100 so that upward pivotal movement of the cinch lever results in upward pivotal movement of the pilot pawl toward the pilot ratchet 90. The cinch lever 130 also has a radially outermost end portion 139 (FIG. 4) disposed adjacent to the sensor lever 118.

A cinch lever spring 140 is supported on the cinch lever 130. The cinch lever spring 140 biases the cinch lever 130 for pivotal movement about the cinch lever support post 134 in a clockwise direction as viewed in FIGS. 4–8.

The cinch mechanism 128 also includes a reduction gear assembly 148 (FIG. 3). The reduction gear assembly 148 includes a pinion gear 150 fixed to the pilot ratchet 90 for rotation with the pilot ratchet and with the spool 50. An end portion 152 of the pinion gear 150 is rotatably supported on the cover 82. The pinion gear 150 is in meshing engagement with an idler gear 154. The idler gear 154 has a hub portion 156 which is rotatably supported on the cover 82. The idler gear 154 is formed as one piece with an intermediate gear 160 which has a smaller circumference than the idler gear.

The cinch mechanism 128 includes an actuator gear 170 which is a one-piece generally disc-shaped member having a circular configuration centered on the spool axis 54. A hub portion 172 (FIG. 3) of the actuator gear 170 is supported on the cover 82 for rotation about the spool axis 54 relative to the cover. An outer peripheral portion 174 of the actuator gear 170 is supported radially outward of the hub portion 172 by four support arms 176 (FIG. 6). The outer peripheral portion 174 (FIG. 3) of the actuator gear 170 has an annular circumferential outer surface 178 which is centered on the spool axis 54.

A plurality of internal gear teeth forming an arcuate gear segment 180 (FIG. 4) are disposed in a circular array on the outer peripheral portion 174 of the actuator gear 170. The gear segment 180 is in meshing engagement with the intermediate gear 160 and has a center of curvature coincident with the spool axis 54. In the preferred embodiment, the gear segment 180 has a circumferential extent of about 200° between its opposite end portions.

Figure 12:
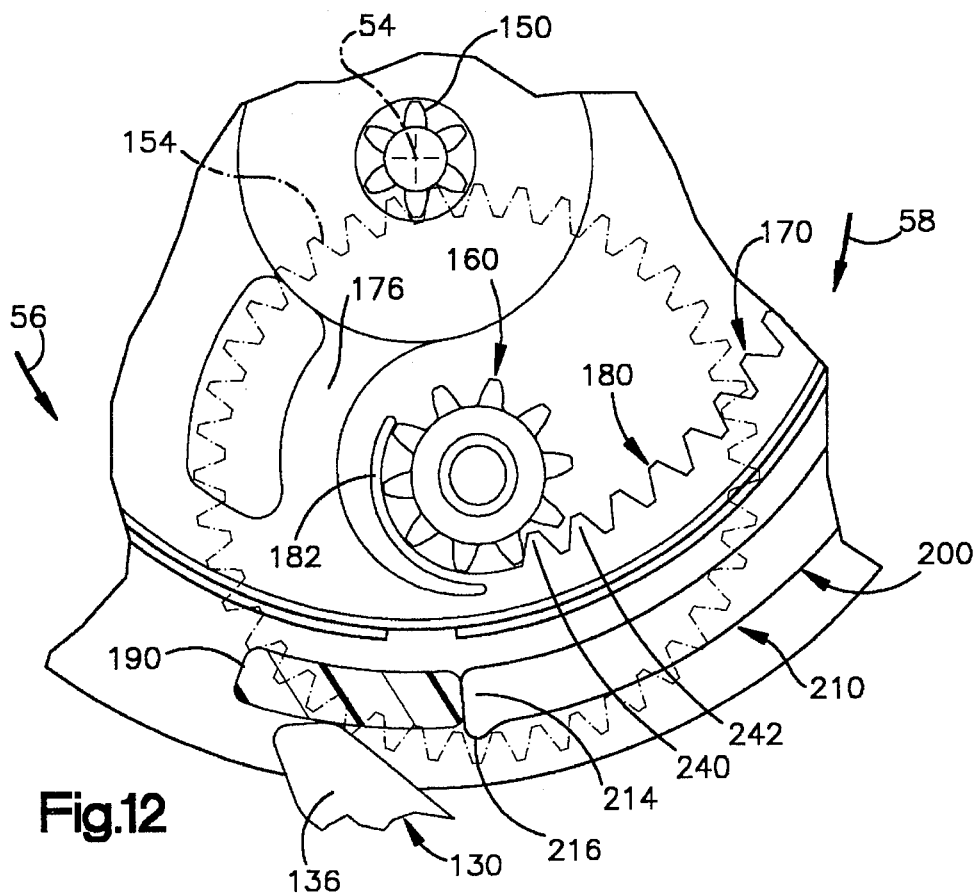
FIG. 12 is an enlarged view showing a spring portion of the retractor of FIG. 1 in a first position.
Figure 13:
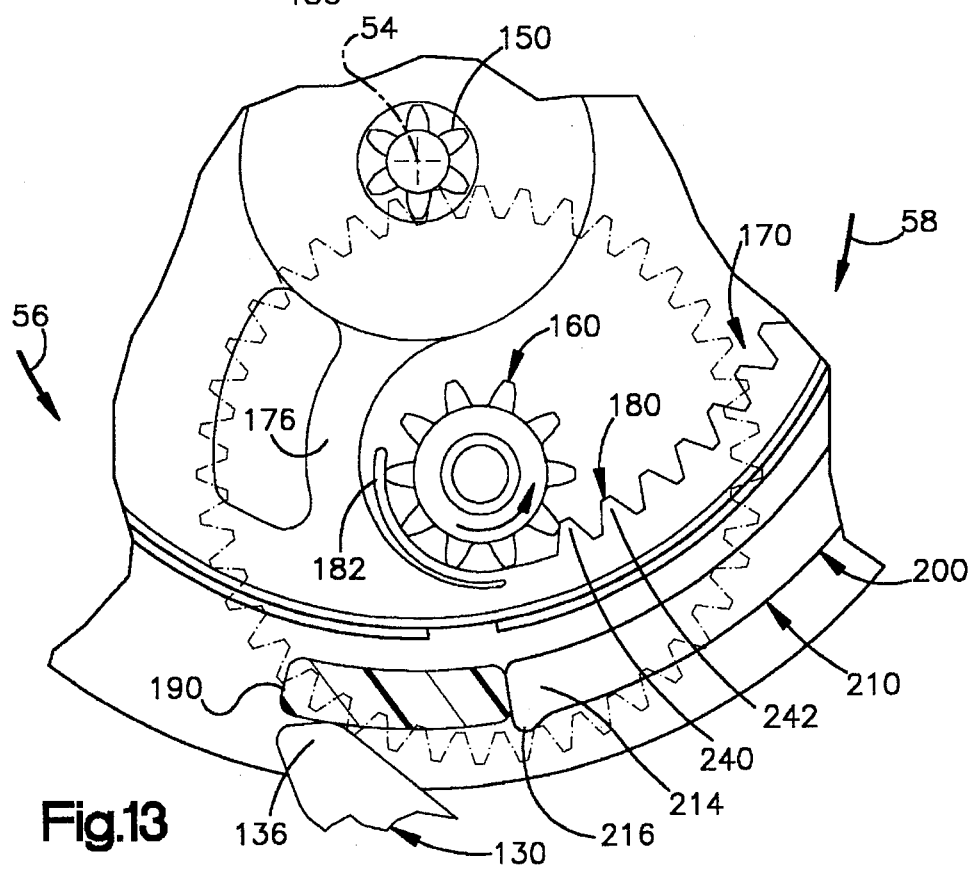
FIG. 13 is a view similar to FIG. 12 showing the spring portion of the retractor in a second position.

The actuator gear 170 of the retractor 10 includes a spring 182 (FIGS. 4, 12 and 13). The spring 182 is a small arcuate finger-like projection which is formed as one piece with the actuator gear 170. The spring 182 is located at the clockwise (as viewed in FIGS. 4–13) end portion of the arcuate gear segment 180 on the actuator gear 170. The spring 182 is disposed adjacent to the last two gear teeth 240 and 242 (FIGS. 12 and 13) of the gear segment 180. The spring 182 is resiliently deflectable from a position shown in FIG. 12 to a position shown in FIG. 13.

The outer peripheral portion 174 of the actuator gear 170 includes two tabs 190 and 192 (FIG. 4) which are spaced from each other. In the preferred embodiment, the circumferential centers of the tabs 190 and 192 are spaced apart by about 120°. Each tab 190 and 192 has a circumferential extent of about 25°. The tabs 190 and 192 are disposed axially coincident with (i.e., lie in the same plane as) the cam follower portion 136 of the cinch lever 130.

The tab 190 has an outer peripheral cam surface 194 (FIG. 4) which has an arcuate configuration centered on the spool axis 54. The tab 192 has an outer peripheral cam surface 196 (FIG. 6) which has an arcuate configuration centered on the spool axis 54. Each one of the cam surfaces 194 and 196 is spaced from the spool axis 54 by the same radial distance, designated R in FIG. 4.

The cinch mechanism 128 also includes an actuator ring 200 (FIGS. 3 and 4). The actuator ring 200 is a one-piece plastic member having a ring shaped or annular configuration. A circular inner peripheral rim 202 (FIG. 3) of the actuator ring 200 is rotatable on the outer peripheral surface 178 of the actuator gear 170. The actuator ring 200 is thereby supported on the actuator gear 170 for rotation about the spool axis 54.

A planar disc portion 204 (FIG. 3) of the actuator ring 200 extends radially outward from the inner peripheral rim 202. A cam lobe 210 (FIGS. 3 and 4) of the actuator ring 200 projects axially from the outer periphery of the disc portion 204. The cam lobe 210 extends for about 185° around the outer periphery of the actuator ring 200. The cam lobe 210 is axially coincident with (i.e., lies in the same plane as) the tabs 190 and 192 on the actuator gear 170.

The cam lobe 210 has an outer peripheral major cam surface 212 (FIG. 4). The major cam surface 212 has an arcuate configuration centered on the spool axis 54. The major cam surface 212 extends for most of the circumferential extent of the cam lobe 210. The major cam surface 212 is spaced from the spool axis 54 by the radial distance R.

A first end portion 214 of the cam lobe 210 has a projecting portion 216 which extends radially outward from the major cam surface 212. The projecting portion 216 has a short circumferential extent and is located directly at the clockwise (as viewed in FIGS. 4–8) circumferential end of the cam lobe 210 on the actuator ring 200. The projecting portion 216 has a minor cam surface 218 (FIG. 9) which is contiguous with the major cam surface 212. The minor cam surface 218 is spaced from the spool axis 54 by a second radial distance which is slightly greater than the radial distance R, that is, slightly greater than the distance by which the major cam surface 212 is spaced from the spool axis.

A second end portion 220 (FIG. 4) of the cam lobe 210 includes a blocking member 230 which extends radially outward from the major cam surface 212. The blocking member 230 is formed as one piece with the cam lobe 210 of the actuator ring 200. The blocking member 230 has a longer circumferential extent than the projecting portion 216 and is located adjacent to the counterclockwise (as viewed in FIGS. 4–8) circumferential end of the cam lobe 210.

The blocking member 230 has a minor cam surface 232 (FIG. 6) which merges via a sloping surface 234 with the major cam surface 212 on the cam lobe 210. The minor cam surface 232 on the blocking member 230 is spaced from the spool axis 54 by a third radial distance which is substantially greater than the radial distance R, that is, substantially greater than the distance by which the major cam surface 212 is spaced from the spool axis.

FIG. 4 illustrates the position of the parts of the of the cinch mechanism 128 of the retractor 10 when the belt webbing 16 is fully retracted onto the spool 50. The tab 192 on the actuator gear 170 is in abutting engagement with the second end portion 220 of the cam lobe 210 of the actuator ring 200. The blocking member 230 on the actuator ring 200 is disposed radially inward of the cam follower portion 136 of the cinch lever 130. The blocking member 230 on the actuator ring 200 holds the cinch lever 130 in a blocking position as shown in FIG. 4. In this position, the end portion 139 of the cinch lever 130 engages the sensor lever 118 and holds the sensor lever and the inertia mass 112 against the sensor housing 116. The cinch lever 130 blocks movement of the sensor lever 118 and of the inertia mass 112 relative to the sensor housing 116. This minimizes rattling of the parts of the vehicle deceleration sensing assembly 110.

When the vehicle occupant withdraws belt webbing 16 from the retractor 10, the spool 50 rotates about the spool axis 54 in the belt withdrawal direction 58, that is, clockwise as viewed in FIG. 4. The pinion gear 150, which is fixed for rotation with the spool 50, also rotates in the belt withdrawal direction 58. The idler gear 154, which is in meshing engagement with the pinion gear 150, rotates in the opposite direction, that is, counterclockwise as viewed in FIGS. 4 and 5. The intermediate gear 160, which is fixed for rotation with the idler gear 154, also rotates in a counterclockwise direction as viewed in FIGS. 4 and 5.

The counterclockwise rotation of the intermediate gear 160 drives the arcuate gear segment 180 to rotate the actuator gear 170 in a counterclockwise direction from the position shown in FIG. 4 toward the position shown in FIG. 5 as the belt webbing 16 is unwound from the spool 50. As the actuator gear 170 rotates about the spool axis 54, the tab 192 on the actuator gear moves circumferentially away from the second end portion 220 of the cam lobe 210 on the actuator ring 200, as can be seen in a comparison between FIGS. 4 and 5. At the same time, the other tab 190 on the actuator gear 170 moves around the spool axis 54 until it engages the first end portion 214 of the cam lobe 210 on the actuator ring 200 as seen in FIG. 5.

As belt webbing 16 continues to be withdrawn, the actuator gear 170 continues to rotate in a counterclockwise direction as viewed in FIG. 5, and pushes the actuator ring 200 to rotate in the same direction around the spool axis 54. The blocking member 230 moves out from under the cam follower portion 136 of the cinch lever 130, that is, out of the blocking position holding the sensor lever 118 and the inertia mass 112 against the sensor housing 116. The cam follower portion 136 of the cinch lever 130 slides circumferentially along the sloping surface portion 234 of the cam lobe 210 onto the major cam surface 212 of the cam lobe 210. As this occurs, the cam follower portion 136 of the cinch lever 130 moves radially inward toward the spool axis 54, because the major cam surface 212 is radially closer to the spool axis than is the minor cam surface 232 on the blocking member 230. When the cam follower portion 136 of the cinch lever 130 is resting on the major cam surface 212 of the cam lobe 210 on the actuator ring 200, the major cam surface holds the cinch lever radially outward against the bias of the cinch lever spring 140. The cinch lever 130 does not urge the pilot pawl 100 into engagement with the pilot ratchet 90. The cinch lever 130 is thus maintained in a radially outward, non-cinching position and the retractor 10 (FIG. 5) is in a non-cinching mode.

Continued withdrawal of belt webbing 16 from the spool 50 causes the tab 190 on the actuator gear 170 to move counterclockwise and to push the cam lobe 210 on the actuator ring 200 circumferentially until the cam lobe moves out from its position radially inward of the cam follower portion 136 of the cinch lever 130. Simultaneously, the tab 190 on the actuator gear 170 moves to a position shown in FIG. 6 radially inward of the cam follower portion 136 of the cinch lever 130. The tab 190 on the actuator gear 170 reaches the position shown in FIG. 6 when a first predetermined amount of the belt webbing 16 has been withdrawn from the retractor 10, typically the full amount of belt webbing on the spool 50.

The tab 190 on the actuator gear 170 holds the cinch lever 130 in a radially outward non-cinching position against the biasing effect of the cinch lever spring 140. The cinch lever 130 does not urge the pilot pawl 100 radially inward into engagement with the pilot ratchet 90. Thus, the cinch mechanism 128 is in a non-cinching mode and does not urge the pilot pawl 100 into engagement with the pilot ratchet 90.

Because the actuator ring 200 is free floating, that is, is not directly gear driven by the spool 50, the cam lobe 210 on the actuator ring and the tab 190 on the actuator gear 170 might become spaced apart slightly from each other, such as by foreign material in a gap between the cam lobe and the tab. The projecting portion 216 (FIGS. 9–11) of the cam lobe 210 on the actuator ring 200, in the following manner, minimizes the effect of any such gap. When the projecting portion 216 of the cam lobe 210 engages the cam follower portion 136 of the cinch lever 130, the biasing force of the cinch lever spring 140 causes the projecting portion to resist further rotational movement of the cam lobe. This is because the projecting portion 216 on the cam lobe 210, in order to pass beneath the cam follower portion 136 of the cinch lever 130, must pivot the cinch lever outward against the biasing force of the cinch lever spring 140. The biasing force of the cinch lever spring 140 thus resists movement of the projecting portion 216 on the cam lobe 210 past the cam follower portion 136 of the cinch lever 130. The cam lobe 210 is held in position by the cinch lever until the tab 190 on the actuator gear 170 catches up with or engages the cam lobe, closing any gap between them. The biasing force of the cinch lever spring 140 is then overcome by the circumferential force exerted on the cam lobe 210 by the tab 190 and the cam lobe rotates with the actuator gear.

Because the projecting portion 216 on the cam lobe 210 on the actuator ring 200 extends radially outward from the major cam surface 212 on the cam lobe on the actuator ring, the cam follower portion 136 of the cinch lever 130 moves radially outward as seen in FIG. 10. Upon continued movement of the tab 190 and the cam lobe 210 in the counterclockwise direction as seen in FIGS. 9–11, the cam follower portion 136 of the cinch lever 130 drops back radially inward onto the cam surface 194 on the tab 190. The cam follower portion 136 of the cinch lever 130 engages the cam surface 194 of the tab 190 at a location spaced apart circumferentially from the counterclockwise end (as viewed in FIG. 11) of the tab 190. In this manner, the cam follower portion 136 of the cinch lever 130 is held away from the area of engagement between the tab 190 and the cam lobe 210. The cam follower portion 136 of the cinch lever 130 is thus prevented from unintentionally falling into any gap which might be created at that area of engagement if the cam lobe 210 of the actuator ring 200 is inadvertently spaced apart from the tab 190.

It is desirable to keep the parts of the cinch mechanism 128, including the reduction gear assembly 148, in a properly timed condition. That is, when the belt webbing 16 is fully withdrawn from the spool 50, the tab 190 on the actuator gear 170 should be disposed radially inward of the cam follower portion 136 of the cinch lever 130. The intermediate gear 160 should be in meshing engagement with the clockwise end portion of the arcuate gear segment 180 on the actuator gear 170, as seen in FIG. 6.

If the belt webbing 16 is not fully withdrawn when the intermediate gear 160 reaches the clockwise end portion of the gear segment 180, then upon continued withdrawal of belt webbing, the intermediate gear continues to rotate in the counterclockwise direction about its fixed central axis. The intermediate gear 160 drives the actuator gear 170 to rotate slightly farther than normal in a counterclockwise direction, as viewed in FIGS. 12 and 13, so that the arcuate gear segment 180 on the actuator gear 170 moves to the position shown in FIG. 13. In this position, the intermediate gear 160 engages the arcuate inner surface of the spring 182 on the actuator gear 170 and causes the spring to be resiliently deflected from the position shown in FIG. 12 to the position shown in FIG. 13 adjacent to the support arm 176.

As more belt webbing 16 is withdrawn, the intermediate gear 160 continues to rotate in the counterclockwise direction. Successive gear teeth on the intermediate gear 160 rotate into and out of engagement with the last gear tooth 240 on the gear segment 180. As this occurs, the actuator gear 170 rotates back and forth about the spool axis 54 by less than a substantial amount, i.e., by no more than the circular pitch of the gear segment 180. (The circular pitch of the gear segment is the distance between similar faces of successive teeth such as the teeth 240 and 242 measured around the pitch circle of the gear segment.) Specifically, the actuator gear 170 is rotated in the belt retraction direction 56 by the gear teeth on the rotating intermediate gear 160. As each successive gear tooth on the intermediate gear 160 clears the last gear tooth 240 on the actuator gear segment 180, as seen in FIG. 13, the actuator gear 170 is rotated in the belt withdrawal direction 58 by the spring force which the resilient spring 182 exerts on the intermediate gear. As a result, the position of the actuator gear 170 remains substantially constant, with the tab 190 being disposed radially inward of the cam follower portion 136 of the cinch lever 130. In this position, continued rotation of the intermediate gear 160 due to withdrawal of belt webbing 16 from the spool 50 does not result in rotation of the actuator gear 170 by a substantial amount.

When the occupant withdraws all the belt webbing 16 from the spool 50, and then releases the belt webbing 16, the intermediate gear 160 begins to rotate in the opposite direction, that is, clockwise as viewed in FIGS. 12 and 13. The biasing effect of the spring 182, together with the force transmitted by the crests of the gear teeth on the intermediate gear 160, causes the actuator gear 170 to be rotated by a small amount in the clockwise direction as viewed in FIGS. 12 and 13. The gear teeth on the intermediate gear 160 engage the last gear tooth 240 on the arcuate gear segment 180 on the actuator gear 170. The parts of the cinch mechanism 128 including the reduction gear assembly 148 thus return to a condition in which rotation of the intermediate gear 160 results in rotation of the actuator gear 170 by a substantial amount. The parts of the cinch mechanism 128 including the reduction gear assembly 148 are properly timed—that is, the tab 190 on the actuator gear 170 is disposed radially inward of the cam follower portion 136 of the cinch lever 130 at a time when the belt webbing 16 is fully withdrawn from the spool 50.

After the belt webbing 16 is completely withdrawn from the spool 50, the vehicle occupant engages the tongue assembly 22 (FIG. 1) with the buckle 26 and releases the belt webbing and the tongue assembly. Under the influence of the rewind spring 60, a second predetermined amount of belt webbing 16 retracts into the retractor 10. The spool 50 rotates about the spool axis 54 in the belt retraction direction 56. The pinion gear 150, which is fixed for rotation with the spool 50, also rotates in the belt retraction direction 56, that is, counterclockwise as viewed in FIGS. 6 and 7.

The idler gear 154, which is in meshing engagement with the pinion gear 150, rotates in the opposite direction, that is, clockwise as viewed in FIGS. 6 and 7. The intermediate gear 160, which is fixed for movement with the idler gear 154, also rotates in a clockwise direction as viewed in FIGS. 6 and 7. Because the intermediate gear 160 is in meshing engagement with the arcuate gear segment 180 on the actuator gear 170, the rotation of the intermediate gear results in rotation of the actuator gear in a clockwise direction around the spool axis 54 as viewed in FIGS. 6 and 7.

As the actuator gear 170 rotates, the tab 190 moves circumferentially out of engagement with the first end portion 214 of the cam lobe 210 of the actuator ring 200. After the second predetermined amount of belt webbing 16 is rewound onto the spool 50, the tab 190 on the actuator gear 170 is in the position shown in FIG. 7. In this position, the tab 190 on the actuator gear 170 is no longer disposed radially inward of the cam follower portion 136 of the cinch lever 130. The biasing force of the cinch lever spring 140 causes the cinch lever 130 to pivot in a clockwise direction as viewed in FIG. 7 into a cinching position. The lifting portion 138 of the cinch lever 130 causes the pilot pawl 100 to pivot radially inward (counterclockwise as viewed in FIGS. 6 and 7) on the lock bar actuator 84. The tooth 102 of the pilot pawl 100 moves into the path of revolution of the pilot ratchet teeth 92. The retractor 10 is in a cinching mode.

Should the occupant of the vehicle seat 14 move forward relative to the seat, the occupant engages the belt webbing 16. Forward movement of the occupant then results in attempted withdrawal of belt webbing 16 from the retractor 10. The retractor spool 50 rotates in the belt withdrawal direction 58. The pilot ratchet 90 is fixed for rotation with the spool 50 and also rotates in the belt withdrawal direction 58. The tooth 102 of the pilot pawl 100, which is disposed in the path of revolution of the ratchet teeth 92 of the pilot ratchet 90, is engaged by one of the moving ratchet teeth. The pilot pawl 100 transmits the rotational force of the pilot ratchet 90 into the lock bar actuator 84.

The lock bar actuator 84 rotates about the spool axis 54. Rotation of the lock bar actuator 84 relative to the frame 40 lifts the finger portion 76 of the lock bar 70 to move the locking portions 74 of the lock bar into engagement with the spool locking ratchet wheels 62. Engagement of the lock bar 70 with the spool locking ratchet wheels 62 blocks rotation of the spool 50 in the belt withdrawal direction 58. This blocks further withdrawal of belt webbing 16 from the retractor 10 to restrain the vehicle occupant.

It should be understood that retraction of the belt webbing 16 onto the spool 50 is not blocked when the retractor 10 is in the cinching mode. This is because the cinch lever 130 is not positively held in the cinching position but rather is spring biased radially inward into the cinching position. The pilot pawl 100 can be moved radially out by the sloped teeth 92 of the pilot ratchet 90 if the pilot ratchet rotates in the belt retraction direction 56, that is, whenever belt webbing 16 is wound onto the spool 50. The retractor 10 is maintained or set in the cinching mode at whatever point the retraction of belt webbing 16 onto the spool 50 ceases.

To take the retractor 10 out of cinching mode, the vehicle occupant disengages the tongue assembly 22 (FIG. 1) from the buckle 26. The seat belt webbing 16 is wound onto the spool 50 of the retractor 10 under the influence of the rewind spring assembly 60. The retractor spool 50 rotates in the belt retraction direction 56, that is, counterclockwise as viewed in FIGS. 7 and 8.

The pinion gear 150, which is fixed for rotation with the spool 50, rotates in the counterclockwise direction. This rotation of the pinion gear 150 effects rotation of the idler gear 154 and the intermediate gear 160 in a clockwise direction (as viewed in FIGS. 7 and 8). The clockwise rotation of the intermediate gear 160 drives the arcuate gear segment 180 on the actuator gear 170 to rotate the actuator gear in a clockwise direction about the spool axis 54. The tab 192 on the actuator gear 170 moves in a clockwise direction as viewed in FIGS. 7 and 8 into engagement with the second end portion 220 of the cam lobe 210 of the actuator ring 200.

The actuator gear 170 continues to rotate, pushing the actuator ring 200 into a position as seen in FIG. 9 in which the major cam surface 212 on the cam lobe 210 on the actuator ring is disposed radially inward of the cam follower portion 136 of the cinch lever 130. The rotating actuator ring 200 causes the cinch lever 130 to move radially outward from the cinching position as viewed in FIG. 7 to a non-cinching position as viewed in FIG. 8. The pilot pawl 100, under the influence of gravity, moves radially outward from the pilot ratchet 90, out of the path of rotation of the pilot ratchet teeth 92. The retractor 10 is thus taken out of the cinching mode. When the belt webbing 16 is thereafter completely wound onto the spool 50, the parts of the cinch mechanism 128 resume the position shown in FIG. 4. In this position, the blocking member 230 on the cam lobe 210 on the actuator ring 200 is disposed radially inward of the cam follower portion 136 of the cinch lever 130.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle seat belt webbing retractor comprising:
    a spool supported for rotation about a spool axis in a belt withdrawal direction and in an opposite belt retraction direction;
    a length of seat belt webbing wound on said spool, said seat belt webbing being extensible about a vehicle occupant to restrain the vehicle occupant;
    a ratchet connected for rotation with said spool in the belt withdrawal direction and in the belt retraction direction;
    a lock pawl supported for movement relative to said ratchet from a disengaged position to an engaged position in engagement with said ratchet to block rotation of said spool in the belt withdrawal direction;
    an actuator lever engageable with said lock pawl and movable from an unactuated position to an actuated position to effect movement of said lock pawl into engagement with said ratchet;
    means for sensing vehicle deceleration comprising an inertia member supported for movement in response to vehicle deceleration above a predetermined deceleration and a sensor lever movable in response to said movement of said inertia member to move said lock pawl into engagement with said ratchet; and
    means responsive to a predetermined amount of rotation of said spool in the belt retraction direction for moving said actuator lever from the unactuated position to a blocking position blocking said movement of said sensor lever and said movement of said inertia member.

2. A retractor as set forth in claim 1 comprising control means for moving said actuator lever from the unactuated position to the actuated position in response to a predetermined amount of rotation of said spool in the belt withdrawal direction followed by a predetermined amount of rotation of said spool in the belt retraction direction.

3. A retractor as set forth in claim 1 including means for supporting said actuator lever for pivotal movement in a first direction from the unactuated position to the actuated position and for pivotal movement in a second direction opposite to said first direction from the unactuated position to the blocking position.

4. A retractor as set forth in claim 1 wherein said means for moving said actuator lever from the unactuated position to the blocking position comprises a cam member movable relative to said actuator lever between a first position supporting said actuator lever in the blocking position and a second position supporting said actuator lever in the unactuated condition and a third position in which said actuator lever is in the actuated condition.

5. A retractor as set forth in claim 1 wherein said means for moving said actuator lever from the unactuated position to a blocking position comprises a member having a portion movable between a position out of engagement with said actuator lever into a position in engagement with said actuator lever in response to a predetermined amount of rotation of said spool in the belt retraction direction.

6. A retractor as set forth in claim 5 wherein said portion of said member comprises a cam surface on said member which is engageable with a cam follower portion of said actuator lever to move said cam follower portion of said actuator lever radially outward from said spool axis from the unactuated position to the blocking position.

7. A retractor as set forth in claim 5 comprising means for supporting said member for rotation about said spool axis and drive means for driving said member for rotation about said spool axis in response to rotation of said spool about said spool axis.

8. A retractor as set forth in claim 7 wherein said drive means comprises a gear train driven by said spool and including an actuator gear, said member comprising an actuator ring driven for rotation by said actuator gear, said portion of said member comprising a cam surface on said actuator ring which is engageable with a cam follower portion of said actuator lever to move said cam follower portion of said actuator lever radially outward from said spool axis from the unactuated position to the blocking position.

9. A retractor as set forth in claim 1 comprising:
    a rotatable member which is rotatable in response to rotation of said spool and which includes an arcuate gear segment, said actuator lever being movable into the actuated position in response to rotation of said rotatable member upon a predetermined amount of rotation of said spool;
    a drive gear rotatable about a fixed axis in response to rotation of said spool about said spool axis, said drive gear being in meshing engagement with said arcuate gear segment on said rotatable member to rotate said rotatable member in response to rotation of said spool; and
    means for enabling rotation of said drive gear while preventing rotation of said rotatable member beyond a predetermined rotational position during rotation of said spool in the belt withdrawal direction.

10. A retractor as set forth in claim 1 wherein said actuator lever includes a cam follower portion, said retractor further including cam means for controlling movement of said actuator lever between the unactuated position and the actuated position, said cam means including first and second relatively movable cam surfaces which are sequentially engageable by said cam follower portion of said actuator lever to hold said actuator lever in the unactuated position, said first cam surface having a projecting portion for moving said cam follower portion of said actuator lever out of the unactuated position in a first direction away from the actuated position.

11. A vehicle seat belt webbing retractor comprising:

a spool supported for rotation about a spool axis in a belt withdrawal direction and in an opposite belt retraction direction;

a length of seat belt webbing wound on said spool, said seat belt webbing being extensible about a vehicle occupant to restrain the vehicle occupant;

a ratchet connected with said spool for rotation with said spool in the belt withdrawal direction and in the belt retraction direction;

a lock pawl supported for movement relative to said ratchet from a disengaged position to an engaged position in engagement with said ratchet to block rotation of said spool in the belt withdrawal direction;

a rotatable member which is rotatable in response to rotation of said spool and which includes an arcuate gear segment having gear teeth;

said lock pawl being movable into engagement with said ratchet in response to rotation of said rotatable member upon a predetermined amount of rotation of said spool;

a drive gear rotatable about a fixed axis in response to rotation of said spool about said spool axis, said drive gear having gear teeth in meshing engagement with said gear teeth on said arcuate gear segment on said rotatable member to rotate said rotatable member in response to rotation of said spool; and means for enabling rotation of said drive gear while preventing rotation of said rotatable member beyond a predetermined rotational position during rotation of said spool in the belt withdrawal direction.

12. A retractor as set forth in claim 11 wherein said means for enabling comprises spring means for urging said gear teeth on said arcuate gear segment into engagement with said gear teeth on said drive gear.

13. A retractor as set forth in claim 12 wherein said spring means comprises a resiliently deflectable spring member which is formed as one piece with said arcuate gear segment.

14. A retractor as set forth in claim 13 wherein said spring member is engageable by said gear teeth on said drive gear to maintain the rotational position of said arcuate gear segment substantially constant.

15. A retractor as set forth in claim 11 wherein said means for enabling comprises means for enabling rotation of said drive gear relative to said arcuate gear segment while the rotational position of said arcuate gear segment remains substantially constant.

16. A retractor as set forth in claim 15 wherein said means for enabling rotation of said drive gear relative to said arcuate gear segment while the rotational position of said arcuate gear segment remains substantially constant comprises means for enabling movement of successive ones of said gear teeth on said drive gear into and out of engagement with a terminal one of said gear teeth on said arcuate gear segment while said rotatable member rotates about said spool axis by no more than the circular pitch of said arcuate gear segment.

17. A retractor as set forth in claim 11 comprising an actuator lever having a cam follower portion, and cam means for controlling movement of said actuator lever from an unactuated position to an actuated position to effect movement of said lock pawl into engagement with said ratchet;

said cam means including first and second relatively movable cam surfaces which are sequentially engageable by said cam follower portion of said actuator lever to hold said actuator lever in the unactuated position, said first cam surface having a projecting portion for moving said cam follower portion of said actuator lever out of the unactuated position in a first direction away from the actuated position.

18. A retractor as set forth in claim 11 further comprising:

means for sensing vehicle deceleration comprising an inertia member supported for movement in response to vehicle deceleration above a predetermined deceleration and a sensor lever movable in response to said movement of said inertia member to move said lock pawl into engagement with said ratchet; and means responsive to a predetermined amount of rotation of said spool in the belt retraction direction for moving said actuator lever from the unactuated position to a blocking position blocking said movement of said sensor lever and said movement of said inertia member.

19. A vehicle seat belt webbing retractor comprising:

a spool supported for rotation about a spool axis in a belt withdrawal direction and in an opposite belt retraction direction;

a length of seat belt webbing wound on said spool, said seat belt webbing being extensible about a vehicle occupant to restrain the vehicle occupant;

a ratchet connected for rotation with said spool in the belt withdrawal direction and in the belt retraction direction;

a lock pawl supported for movement relative to said ratchet from a disengaged position to an engaged position in engagement with said ratchet to block rotation of said spool in the belt withdrawal direction;

an actuator lever engageable with said lock pawl and movable from an unactuated position to an actuated position to effect movement of said lock pawl into engagement with said ratchet, said actuator lever having a cam follower portion; and cam means for controlling movement of said actuator lever between the unactuated position and the actuated position;

said cam means including first and second relatively movable cam surfaces which are sequentially engageable by said cam follower portion of said actuator lever to hold said actuator lever in the unactuated position, said first cam surface having a projecting portion for moving said cam follower portion of said actuator lever out of the unactuated position in a first direction away from the actuated position.

20. A retractor as set forth in claim 19 wherein said projecting portion on said first cam surface is engageable with said cam follower portion upon movement of said cam surfaces from a first position in which said cam follower portion of said actuator lever is in engagement with said first cam surface to a second position in which said cam follower portion of said actuator lever is in engagement with said second cam surface.

21. A retractor as set forth in claim 19 wherein said cam means comprises a first rotatable member having said first cam surface and having a trailing end portion, said cam means further comprising a second rotatable member having said second cam surface and having a leading end portion engageable with said trailing end portion of said first rotatable member to rotate said first rotatable member in a second direction about said spool axis in response to rotation of said second rotatable member in said second direction.

22. A retractor as set forth in claim 21 wherein said trailing end portion of said first rotatable member includes said projecting portion of said first cam surface.

23. A retractor as set forth in claim 19 wherein said first cam surface includes a major cam surface portion having an arcuate configuration centered on said spool axis for holding said cam follower portion of said actuator lever at a first radial distance from said spool axis when said actuator lever is in the unactuated position, said projecting portion of said first cam surface being contiguous with said major cam surface portion of said first cam surface.

24. A retractor as set forth in claim 23 wherein said projecting portion of said first cam surface has a radial distance from said spool axis which is greater than the radius of curvature of said major cam surface portion of said first cam surface.

25. A retractor as set forth in claim 19 wherein said cam means comprises an actuator gear and an actuator ring, said actuator gear being driven for rotation about said spool axis in response to rotation of said spool about said spool axis, said second cam surface being formed on said actuator gear, said actuator ring being movable relative to said actuator gear and being driven for rotation about said spool axis by said actuator gear, said first cam surface being formed on said actuator ring.

26. A retractor as set forth in claim 19 further comprising:

a rotatable member which is rotatable in response to rotation of said spool and which includes an arcuate gear segment, said actuator lever being movable into the actuated position in response to rotation of said rotatable member upon a predetermined amount of rotation of said spool;

a drive gear rotatable about a fixed axis in response to rotation of said spool about said spool axis, said drive gear being in meshing engagement with said arcuate gear segment on said rotatable member to rotate said rotatable member in response to rotation of said spool; and means for enabling rotation of said drive gear while preventing rotation of said rotatable member beyond a predetermined rotational position during rotation of said spool in the belt withdrawal direction.

27. A retractor as set forth in claim 19 further comprising:

means for sensing vehicle deceleration comprising an inertia member supported for movement in response to vehicle deceleration above a predetermined deceleration and a sensor lever movable in response to said movement of said inertia member to move said lock pawl into engagement with said ratchet; and means responsive to a predetermined amount of rotation of said spool in the belt retraction direction for moving said actuator lever from the unactuated position to a blocking position blocking said movement of said sensor lever and said movement of said inertia member.

* * * * *